United States Patent [19]

Shirai et al.

[11] Patent Number: 4,654,409

[45] Date of Patent: Mar. 31, 1987

[54] ADHESIVE COMPOSITIONS FOR COMPOSITE LAMINATE FILMS COMPRISING POLYOL, POLYISOCYANATE AND ANHYDRIDE HAVING AT LEAST TWO ACID ANHYDRIDE GROUPS

[75] Inventors: Naotake Shirai, Tokyo; Michio Sugitani, Hasuda, both of Japan

[73] Assignee: Dainippon Ink and Chemicals, Inc., Tokyo, Japan

[21] Appl. No.: 765,205

[22] Filed: Aug. 13, 1985

[30] Foreign Application Priority Data

Aug. 14, 1984 [JP] Japan ................................ 59-168885

[51] Int. Cl.$^4$ ............................................. C08G 18/00

[52] U.S. Cl. ........................................ 528/26; 528/28; 528/73; 528/905

[58] Field of Search ...................... 528/73, 905, 26, 28

[56] References Cited

U.S. PATENT DOCUMENTS 3,437,636 4/1969 Angelo ................................... 528/73
3,562,189 2/1971 Farrissey et al. ...................... 528/73

Primary Examiner—Maurice J. Welsh
Attorney, Agent, or Firm—Sherman and Shalloway

[57] ABSTRACT

An adhesive composition for composite laminate film comprising an organic polymer polyol, an organic polyisocyanate and a polybasic acid anhydride having at least two acid anhydride groups in a molecule.

15 Claims, No Drawings

ADHESIVE COMPOSITIONS FOR COMPOSITE LAMINATE FILMS COMPRISING POLYOL, POLYISOCYANATE AND ANHYDRIDE HAVING AT LEAST TWO ACID ANHYDRIDE GROUPS

This invention relates to an adhesive composition for composite laminate film having excellent resistance to acids and resistance to hot water, and more specifically to an adhesive composition that provides excellent adhesion, resistance to acids and resistance to hot water when producing a composite film by laminating various plastic films, aluminum foil, paper, etc.

In recent years, multilayered composite films obtained by laminating plastic films of polyethylene, polypropylene, nylon and polyethylene terephthalate and metallic foils such as an aluminum foil in two, three or four layers have found widespread use as materials for packaging food, medicines, cosmetics, etc. The plastics and the metallic foils have been so far adhered using polyester-type adhesives or polyester polyurethane-type adhesives.

However, the packaging materials obtained by using such adhesives have possessed drawbacks that they are poor in resistance to acids and resistance to hot water. For instance, when highly acidic food containing a vinegar or free fatty acid is packed in the packaging materials and subjected to retort sterilization above 120° C., not only is an adhesive strength between plastics and metallic foils decreased, but also is a strength as a packaging material decreased. What is worse, they are completely delaminated so that pinholes occur in the metallic foils to decrease an airproof property of the metallic foils, making impossible the long-term storage of the packaging materials. Moreover, when packing the highly acidic food with the high content of the vinegar or free fatty acid in the packaging materials, the adhesive strength decreases during the long-term storage and the plastic films are delaminated from the metallic foils even if a high temperature sterilization step such as boiling or retorting is not carried out.

An object of this invention is to provide an adhesive composition free from these drawbacks. The present inventors have made various studies and consequently discovered that a polyurethane adhesive composition having excellent adhesive strength, resistance to acids and resistance to hot water can achieve this object.

Thus, the present invention is to provide an adhesive composition for composite laminate film comprising an organic polymer polyol, an organic polyisocyanate and a polybasic acid anhydride having at least two acid anhydride groups in a molecule.

Examples of the organic polymer polyol used in this invention are compounds having about 2 to 6, preferably about 2 to 4 functional groups, and a number-average molecular weight of about 500 to 100,000, preferably 1,000 to 30,000. To be more concrete, polyester polyols, polyether polyols, polyether ester polyols, polyurethane polyols or mixtures thereof can be taken.

Examples of the polyester polyols are those obtained by reacting dibasic acids such as terephthalic acid, isophthalic acid, adipic acid, azelaic acid and sebacic acid, dialkyl esters thereof and mixtures thereof with glycols such as ethylene glycol, propylene glycol, diethylene glycol, butylene glycol, neopenthyl glycol, 1,6-hexanediol and mixtures thereof.

Examples of the polyether polyols are those obtained by polymerizing oxirane compounds such as ethylene oxide, propylene oxide, butylene oxide and tetrahydrofuran using water or low-molecular-weight polyols such as ethylene glycol, propylene glycol, trimethylolpropane and glycerin as an initiator.

Examples of the polyether ester polyols are those obtained by reacting dibasic acids such as terephthalic acid, isophthalic acid, adipic acid, azelaic acid and sebacic acid, dialkyl esters thereof and mixtures thereof with the above polyether polyols.

The polyurethane polyols are those having a urethane bond in a molecule. Said polyurethane polyols are formed by reacting the polyether polyols, polyester polyols or polyether ester polyols having a molecular weight of about 200 to 5,000 with organic polyisocyanates to be described later in a NCO/OH molar ratio of less than 1, preferably at most about 0.8.

Moreover, low-molecular-weight polyols having a number-average molecular weight of 200 or less may be used conjointly with the foregoing polyols for the purpose of adjusting the average molecular weight of the polyol component. Examples of such low-molecular-weight polyols are ethylene glycol, propylene glycol, butylene glycol, diethylene glycol, dipropylene glycol, hexylene glycol, neopentyl glycol, cyclohexane dimethanol, glycerin and trimethylolpropane.

Examples of the organic polyisocyanates used in this invention are aliphatic diisocyanates such as hexamethylene diisocyanate, 2,4,4-trimethylhexamethylene diisocyanate and 2,2,4-trimethylhexamethylene diisocyanate; alicyclic diisocyanates such as 3-isocyanatomethyl-3,5,5-trimethylcyclohexyl isocyanate; aromatic diisocyanates such as 2,4-tolylene diisocyanate, 2,6-tolylene diisocyanate, a mixture thereof, 4,4'-diphenylmethane diisocyanate and 1,5-naphthalene diisocyanate; araliphatic diisocyanates such as 1,3-xylylene diisocyanate, 1,4-xylylene diisocyanate, a mixture thereof and W,W'-diisocyanate-1,4-diethylbenzene; aromatic triisocyanates such as triphenylmethane-4,4',4''-triisocyanate; a dimer, trimer, biuret and allophanate derived from the above polyisocyanate monomers; addition products of low-molecular-weight polyols with a molecular weight of less than 200 such as trimethylolpropane and glycerin, and the above polyisocyanates; and addition products of the above polyols having the molecular weight of 200 to 30,000 such as the polyesters polyols, polyether polyols and polyether ester polyols, and the above polyisocyanates.

Preferable examples of the polybasic acid anhydrides containing at least two acid anhydride groups in the molecule as used in this invention are pyromellitic dianhydride, benzophenone tetracarboxylic dianhydride, 2,3,6,7-naphthalenetetracarboxylic dianhydride and 5-(2,5-dioxotetrahydrofuryl)-3-methyl-3-cyclohexene-1,2-dicarboxylic anhydride. These may be used singly or as a mixture of two or more thereof. Said polybasic acid anhydrides may be contained such that they are chemically bound to the polymer polyols or simply mixed therewith. Accordingly, said polybasic acid anhydrides may be added at the start-up of, during, or in the end of, the reaction to produce the polymer polyols.

An amount thereof is about 0.05 to 20% by weight, preferably 0.1 to 10% by weight based on the total adhesive composition. Where the amount is less than 0.05% by weight, the above effect of the improvement is not found at all. Where the amount is more than 20% by weight, it becomes economically disadvantageous because the polybasic acid anhydrides are costly. Said polybasic acid anhydrides play an extremely important part to increase an adhesive strength between a plastic film and a metallic foil or between plastic films and improve resistance to acids and resistance to hot water.

Where a silane coupling agent is conjointly used, an adhesive strength at high temperatures or high humidity between a plastic film and a metallic foil or between plastic films can be further increased.

As the silane coupling agent, a compound of formula

wherein X denotes an organic group having one or more active hydrogen atoms and R denotes a lower alkyl group, is commonly preferable. An amount of the silane coupling agent is 0.05 to 20% by weight, preferably 0.1 to 10% by weight based on the total adhesive composition.

The adhesive composition of this invention is prepared by mixing the above organic polymer polyols, organic polyisocyanates and polybasic acid anhydrides such that a NCO/active hydrogen equivalent ratio is 1 to 10, preferably 1.5 to 7.

The adhesive composition of this invention is of either a solvent type or a solvent-free type. When said adhesive composition is applied to lamination, a usual method is employed. Examples thereof are a method which comprises coating an organic solvent solution-type adhesive on a film surface through a dry laminator equipped with a dryer, volatilizing the solvent and adhering the bonded surfaces, and a method which comprises coating a solvent-free-type adhesive on a film surface at room temperature or under heating through a solvent-free-type laminator, adhering the bonded surfaces, and then curing the composition at room temperature or under heating. An amount of coating may usually be about 0.8 to 3.0 g/m$^2$ in the solvent-free-type adhesive or about 3.0 to 5.0 g/m$^2$ in the solvent-type adhesive.

The adhesive composition of this invention exhibits, as is apparent from the Example to be described later, quite excellent adhesive strength, resistance to acids, and resistance to hot water when used for adhesion between a metallic foil such as an aluminum foil and a plastic film of polyethylene, polypropylene, nylon or polyethylene terephthalate. This makes it possible to produce packaging materials having excellent resistance to food by which the metallic foil is not delaminated from the plastic film even through a sterilization step at a high temperature of 120° C. or above which is conducted with the packaging container packed with food and sealed, as well as excellent long-term storage stability of food.

The following Example illustrates this invention in more detail.

In said Example, all percentages are on the weight basis.

EXAMPLE (1) Using a mixture of 194.2 g of dimethyl terephthalate, 124 g of ethylene glycol, 208.3 g of neopentyl glycol, 0.14 g of antimony trioxide and 0.2 g of zinc acetate, a transesterification reaction was conducted at 160° to 220° C. in an atmosphere of nitrogen. After a given amount of methanol was distilled off, 202.3 g of sebacic acid was added and an esterification reaction was conducted at 220° to 230° C. A pressure was progressively reduced and condensation was performed at 230° to 260° C. for 30 minutes, followed by a polycondensation reaction at 270° to 275° C. and 0.1 to 0.2 mmHg for 2 hours. There resulted a polyester glycol having a number-average molecular weight of about 10,000. 100 g of the resulting polyester glycol was dissolved in 100 g of a toluene/methyl ethyl ketone (1/1 weight ratio) solvent mixture to afford a solution having a solids content of 50%. This solution is called a polyol I.

(2) According to the method of producing the polyol I, there was obtained a polyester glycol with a number-average molecular weight of about 2,000 wherein an isophthalic acid/adipic acid molar ratio was 1/1 and an ethylene glycol/neopenthyl glycol molar ratio was 1/1. This polyester glycol is called a polyol II.

(3) A mixed solution comprising 100 g of polyester glycol having a number-average molecular weight of 2,000, 11.1 g of 3-isocyanatomethyl-3,5,5-trimethylcyclohexyl isocyanate, 111.1 g of ethyl acetate and 0.03 g of dibutyltin dilaurate as a catalyst was reacted at 65° C. for 7 hours. Subsequently, 4.0 g of trimethylolpropane was added, and the mixture was further reacted for 1 hour to provide a solution of polyurethane polyol having a solids content of 50%. This solution is called a polyol III.

(4) 500 g of polyoxypropylene glycol having a number-average molecular weight of 2,000, 31.3 g of diphenylmethane diisocyanate and 227.7 g of ethyl acetate were reacted at 90° C. for 6 hours to obtain a solution of polyether polyurethane polyol having a number-average molecular weight of about 4,500. This solution is called a polyol IV.

(5) 500 g of polyoxypropylene glycol having a number-average molecular weight of 1,000 was reacted with 250 g of diphenylmethane diisocyanate at 90° C. for 7 hours to afford polyether polyurethane polyisocyanate having a NCO group content of 5.6% and a number-average molecular weight of 1,500. This polyisocyanate is called an organic polyisocyanate I.

(6) A mixed solution comprising 174.2 g of tolylene diisocyanate, 44.7 g of trimethylolpropane and 73.0 g of ethyl acetate was reacted at 65° C. for 3 hours to afford a solution of polyurethane polyisocyanate having a solids content of 75%, a NCO group content of 14.4% and a number-average molecular weight of 657. This solution is called an organic polyisocyanate II.

(7) A mixed solution comprising 111.2 g of 3-isocyanatomethyl-3,5,5-trimethylcyclohexyl isocyanate, 22.3 g of trimethylolpropane, 44.5 g of ethyl acetate and 0.03 g of dibutyltin dilaurate was reacted at 65° C. for 4 hours to provide a solution of polyurethane polyisocyanate having a solids content of 75%, a NCO group content of 11.8% and a number-average molecular weight of 800. This solution is called an organic polyisocyanate III.

(8) There was used biuret of hexamethylene diisocyanate having a NCO group content of 21.3% (CORONATE EH; a trade name of a product made by Nippon Polyurethane K.K.). This is called an organic polyisocyanate IV.

Adhesive compositions 1–13 were prepared by mixing organic polymer polyols (polyester glycol, polyester polyurethane polyol and polyether polyurethane polyol), organic polyisocyanates and polybasic acid anhydrides as shown in Table 1.

Using the respective adhesive compositions shown in Table 1, three-layered composite films were produced by a method to be described later, and an adhesion test and tests of resistance to hot water and resistance to acids were performed for the individual three-layered composite films. For comparison, adhesive compositions 14–17 free of polybasic acid anhydrides were prepared and subjected to the above tests. The test methods are described below. The results are shown in Table 2.

Production of three-layered composite films

A composite film having a structure of polyethylene terephthalate film (12μ thick)/aluminum foil (15μ thick)/unoriented polypropylene film was produced in the following manner. That is, out of the adhesive compositions shown in Table 1, each of the compositions Nos. 6 and 15 was coated on the polyethylene terephthalate film at a temperature of 80° to 100° C. and each of the other compositions at room temperature by means of a laminator. If the compositions contained a solvent, said solvent was volatilized, and the coated surface was then adhered to the surface of the aluminum foil. Subsequently, the adhesive composition was coated on another surface of the aluminum foil in the composite film. If the composition contained the solvent, said solvent was volatilized, and the coated surface was adhered to the unoriented polypropylene. The thus laminated film was then kept at 40° C. for 3 hours to cure the adhesive composition.

was measured and a storage stability (peel condition after storage at 40° C. for 30 days) was examined. Each of the tests was conducted for 5 packs. The results demonstrated in Table 2 are averages of values obtained.

TABLE 2

| | Adhesive No. | Adhesion test Peel strength (g/15 mm) | Tests of resistance to hot water and resistance to acids | | |
|---|---|---|---|---|---|
| | | | Peel strength (g/15 mm) | Peel condition | Storage stability |
| This invention | 1 | 1200 | 1300 | not peeled | not peeled |
| | 2 | 1100 | 1300 | " | " |
| | 3 | 1200 | 1200 | " | " |
| | 4 | 1300 | 1400 | " | " |
| | 5 | 1400 | 1500 | " | " |
| | 6 | 1100 | 1000 | " | " |
| | 7 | 1800 | 1500 | " | " |
| | 8 | 1300 | 1600 | " | " |
| | 9 | 1500 | 1600 | " | " |
| | 10 | 1200 | 1100 | " | " |
| | 11 | 1600 | 1700 | " | " |
| | 12 | 1300 | 1500 | " | " |
| | 13 | 1200 | 1300 | " | " |
| Comparative Example | 14 | 1000 | 300 | partially peeled | completely peeled |
| | 15 | 900 | 200 | partially peeled | completely peeled |
| | 16 | 1100 | 400 | partially peeled | completely peeled |
| | 17 | 1000 | 300 | partially peeled | completely peeled |

TABLE 1

| Adhesive No. | Organic polymer polyol (parts by weight) | | | | Organic polyisocyanate (parts by weight) | | | | Polybasic acid anhydride (parts by weight) | | |
|---|---|---|---|---|---|---|---|---|---|---|---|
| | I | II | III | IV | I | II | III | IV | a | b | c |
| This invention 1 | 100 | | | | 10 | | | | 1 | | |
| 2 | 100 | | | | | 10 | | | 1 | | |
| 3 | 100 | | | | 10 | | | | | 1 | |
| 4 | 100 | | | | 10 | | | | 5 | | |
| 5 | 100 | | | | 10 | | | | 10 | | |
| 6 | | 100 | | | | | | 50 | 1.5 | | |
| 7 | | | 100 | | 10 | | | | 1 | | |
| 8 | | | 100 | | | 10 | | | 1 | | |
| 9 | | | 100 | | 10 | | | | | | 1 |
| 10 | | | | 100 | | 50 | | | 1.5 | | |
| 11 | 50 | | 50 | | 10 | | | | 1 | | |
| 12 | 50 | | 50 | | | 10 | | | 1 | | |
| 13 | 50 | | 50 | | | 10 | | | 0.5 | | |
| Comparative Example 14 | 100 | | | | 10 | | | | | | |
| 15 | | 100 | | | | | | 50 | | | |
| 16 | | | 100 | | 10 | | | | | | |
| 17 | | | | 100 | | 50 | | | | | |

(Note)
a Pyromellitic dianhydride
b Benzophenone tetracarboxylic dianhydride
c 5-(2,5-Dioxotetrahydrofuryl)-3-methyl-3-cyclohexene-1,2-dicarboxylic anhydride Adhesion test Test samples each having a size of 300 mm×15 mm were taken from the above formed composite films. Using these test samples, a peel strength was measured through T-peel at a peel rate of 300 mm/min with an Instron tensile tester. As for the measured value, a peel strength (g/15 mm) between the aluminum foil and the unoriented polypropylene film was shown by an average of values of five test samples.

Tests of resistance to hot water and resistance to acids

Using each of the composite films, a pack having a size of 12 cm×14 cm was produced and filled with a vinegar/salad oil/meat sauce (1/1/1) mixed solution. This pack was subjected to hot water sterilization at 120° C. and 1.5 kg/cm² for 30 minutes. Subsequently, a peel condition between the aluminum foil and the unoriented polypropylene film was observed, a peel strength From the foregoing results, it can be understood that the addition of polybasic acid anhydrides having at least two acid anhydride groups in the molecule markedly improves the resistance to hot water and resistance to acids of the adhesive compositions composed of the organic polymer polyols and the organic polyisocyanates, and that the adhesive compositions of this invention are therefore excellent as adhesives for composite laminate films for producing retort food packaging materials which are packed with highly acidic food.

What we claim is:

1. An adhesive composition for a composite laminate film comprising an organic polymer polyol, an organic polyisocyanate and a polybasic acid anhydride having at least two acid anhydride groups in a molecule said composition having an NCO/active hydrogen equivalent ratio of 1 to 10.

2. The adhesive composition of claim 1 wherein the organic polymer polyol is a polyester polyol, a polyether polyol, a polyether ester polyol or a polyurethane polyol.

3. The adhesive composition of claim 1 or 2 wherein the organic polymer polyol has a number-average molecular weight of 500 to 100,000.

4. The adhesive composition of any one of claims 1–3 wherein the polybasic acid anhydride is a tetrabasic acid dianhydride.

5. The adhesive composition of any one of claims 1–4 wherein said adhesive composition contains an organic solvent.

6. The adhesive composition of any one of claims 1–4 wherein said adhesive composition does not contain an organic solvent.

7. An adhesive composition for composite a laminate film comprising an organic polymer polyol, an organic polyisocyanate and a polybasic acid anhydride having at least two acid anhydride groups in a molecule wherein the organic polymer polyol is a compound having 2 to 4 functional groups and a number average molecular weight of 1,000 to 30,000 and the polybasic acid anhydride having at least two acid anhydride groups is chemically bound to the polymer polyol or mixed therewith and is present in an amount of 0.05 to 20% by weight based on the total adhesive composition, said adhesive composition exhibiting improved resistance to hot water and to acids while providing excellent adhesion.

8. The adhesive composition of of claim 7 wherein the the polybasic acid anhydride having at least two acid anhydride groups comprises one or a mixture of two or more of the members of the group consisting of pyromellitic dianhydride, benzophenone tetracarboxylic dianhydride, 2,3,6,7-naphthalenetetracarboxylic dianhydride and 5-(2,5-dioxotetrahydrofuryl)-3-methyl-3-cyclohexene-1,2-dicarboxylic anhydride.

9. The adhesive composition of claim 7 further including a silane coupling agent of the formula

wherein X denotes an organic group having one or more active hydrogen atoms and R denotes a lower alkyl group, in an amount of 0.05 to 20% by weight based on the total adhesive composition.

10. The adhesive composition of claim 7 wherein the organic polymer polyol, organic polyisocyanate and polybasic acid anhydride are mixed such that the NCO/active hydrogen equivalent ratio is 1 to 10.

11. The adhesive composition of claim 7 wherein the organic polymer polyol is a polyester polyol, a polyether polyol, a polyether ester polyol or a polyurethane polyol.

12. The adhesive composition of claim 11 wherein the polyester polyol is obtained from the reaction of a dibasic acid, a dialkyl ester of a dibasic acid or mixtures thereof, with a glycol.

13. The adhesive composition of claim 11 wherein the polyesther polyol is obtained by polymerizing an oxirane compound using water or a low-molecular weight polyol as an initiator.

14. The adhesive composition of claim 11 wherein the polyether ester polyol is obtained by the reaction of a dibasic acid, a dialkyl ester of a dibasic acid or a mixture thereof, with the polyether polyol.

15. The adhesive composition of claim 11 wherein the polyurethane polyol is formed by reacting the polyether polyol, polyester polyol or polyether ester polyol having molecular weights of 200 to 5,000 with an organic polyisocyanate in an NCO/OH molar ratio of less than 1.

* * * * *